3,677,991
ANIONIC ACRYLATE LATEXES THAT POSSESS SENSITIVITY TO ALKALINITY
Carl Moore, Midland, Mich., assignor to The Dow Chemical Company, Midland, Mich.
No Drawing. Filed Aug. 14, 1968, Ser. No. 752,723
Int. Cl. C08f 1/92
U.S. Cl. 260—29.6 H
12 Claims

ABSTRACT OF THE DISCLOSURE

Anionic latexes of copolymers comprising a lower alkyl acrylate such as butyl acrylate and an $\alpha,\beta$-ethylenically unsaturated carboxylic monomer such as methacrylic acid and maleic anhydride capable of being coagulated by adjusting the pH of the latex to a value ranging from about 8.8 to about 10.1.

BACKGROUND OF THE INVENTION

This invention relates to anionic latexes and the coagulation thereof, and more particularly, to certain anionic acrylic latex compositions which coagulate under alkaline conditions.

It is well known to coat articles with anionic latexes, i.e. aqueous compositions which contain colloidal dispersions of anionic film-forming polymers. When the water evaporates from the coating, a strong film of the polymer remains adhered to the article. However, prior to substantially complete evaporation of the water, the coating is easily damaged or deranged. Thus, handling of the coated article prior to drying, which is often desirable, is essentially precluded. In order to overcome this handling problem, the wet coating, after application to the article, is coagulated, i.e. by adding a coagulating agent. The coagulated wet coating in the form of a wet gel is much more resistant to shearing and stripping forces.

Conventionally, anionic latex compositions are coagulated or destabilized by adding acid to the composition. However in many instances the addition of acid is undesirable, for example, many copolymers discolor readily in the presence of strong acid. Also the acidic vapors corrode the various apparatus used in the coagulation step. These problems do not arise when a base is utilized as the coagulating means; thus it would be highly desirable to provide anionic latex compositions which can be destabilized by raising the pH instead of lowering it.

Summary of the invention

It is therefore an object of this invention to provide a latex which can be coagulated under basic conditions.

Another object is to provide a latex which does not discolor during or after the destabilization process.

Other objects and advantages of this invention will become apparent from the following description and embodiments.

The objects of this invention are accomplished by an anionic acrylic latex composition which is coagulated by adjusting the pH of the composition to a value in the range of from about 8.8 to about 10.1 and by adjusting the solids content of the composition to a percentage by weight based on the total composition ranging from about 45 to about 69, said composition comprising (1) a copolymer of from about 70 percent to about 98.5 percent of an alkyl acrylate ester having an alkyl moiety from 1 to 12 carbon atoms, from about 1.5 to about 8 percent of a suitable $\alpha,\beta$-ethylenically unsaturated carboxylic monomer, and up to about 28 percent of another ethylenically unsaturated monomer and (2) a stabilizing emulsifier present in amounts less than that required to completely cover the surface area of the particular latex copolymer; said percentages being by weight. By "$\alpha,\beta$-ethylenically unsaturated carboxylic monomer" is meant an $\alpha,\beta$-ethylenically unsaturated carboxylic acid or an anhydride of such an acid. By "stabilizing emulsifier" is meant an anionic or nonionic emulsifier or a mixture thereof.

The actual coagulating mechanism is not known, but it is thought to be dependent on the presence of the specific carboxylic group on the surface of latex particles. Destabilization is thought to occur when the base is present in sufficient amount to neutralize the carboxylic group on the surface of the latex particle. Destabilization is probably caused by a position rearrangement of the carboxyl groups resulting in the orientation of the alkyl moiety of the carboxylic acid toward the water phase. This rearrangement phenomena removes the ionized groups from their role as surface stabilizing charges.

The anionic latex compositions utilized in this invention are capable of being stored for many months at a pH of 5.5 to 6.0 without undergoing any appreciable coagulation. These anionic latex compositions may be coated, sprayed, dipped or washed onto the substrates and then coagulated in place by spraying or roll coating solutions of base onto the coated substrate, or by exposing the coated item to gaseous ammonia. These compositions may be used alone or in combined formulation to coat rods, filaments, films, textiles, paper, fabrics, wood products, metallic surfaces, plastics, foams, leather and the like. Also latex froths made from these latex compositions may be coagulated merely by exposing them to a gaseous base to form gels which may then be cured and dried in order to prepare the finished latex foam. Decorative embossed coatings may also be set in place, with no loss of pattern, by the simple expedient of raising pH. Heating and drying is then carried out in the normal manner.

DESCRIPTION OF THE PREFERRED EMBODIMENTS

Suitable alkyl acrylate esters are the esters of acrylic acid having alkyl moieties from 1 to 12 carbon atoms such as n-butyl acrylate, ethyl acrylate, t-butyl acrylate, methyl acrylate, 2-ethylhexyl acrylate, n-propyl acrylate, dodecyl acrylate and the like. These monomers may be used alone or in combination with one or more of the other suitable alkyl acrylate esters.

Examples of suitable $\alpha,\beta$-ethylenically unsaturated carboxylic monomers are methacrylic acid, maleic acid, fumaric acid, itaconic acid, aconitic acid, and maleic anhydride. The suitable carboxylic monomers may also be used alone or in combination with one another.

Although the acid content of the copolymer may be 8 percent or higher, dried films of polymers containing 8 percent or more of a carboxylic monomer show increased water and alkali sensitivity. Therefore, the maximum concentration of carboxylic monomer is set at about 8 percent by weight based on copolymer with the preferred amounts ranging from about 2 to about 5 percent.

While the alkyl acrylate ester or esters are definitely the major component of the copolymer, i.e., at least 70 percent by weight of the copolymer, minor amounts of other monomers other than the carboxylic monomers may also be present in the copolymer. Monomers suitable for this purpose must be copolymerizable with the monomers of the aforementioned groups and must not react with the carboxyl group of the acid monomer. Monomers suited for this purpose are the ethylenically unsaturated monomers such as the $\alpha$-olefins, e.g., ethylene, propylene, butene-1, and the like; diolefins, e.g., butadiene and isoprene; monovinylidene aromatics, e.g., styrene, $\alpha$-methylstyrene, ar-methylstyrene, t-butylstyrene, and the like; esters of $\alpha,\beta$-ethylenically unsaturated carboxylic acids, e.g. methyl methacrylate, ethyl methacrylate, dimethyl fumarate, diethyl maleate and the like; and the vinyl compounds, e.g., vinyl acetate, acrylonitrile, vinyl chloride, vinyl bromide, divinyl benzene and so forth. Other suitable ethylenically unsaturated monomers are ethylene dimethacrylate, vinylidene chloride, β-hydroxyethyl acrylate, acrylamide and the like. These monomers should not be present in concentrations greater than about 28 percent by weight based on copolymer.

It is generally necessary to add a stabilizing emulsifier to maintain the composition as a latex prior to the time that the composition is to be coagulated, but only that amount of emulsifier required to maintain the latex in a stable state should be used. It is critical that the stabilizing emulsifier be present in amounts less than that required to completely cover the surface area of the particular latex copolymer, preferably in amounts such that the surface tension of the resulting latex composition is greater than 40 dynes per centimeter. For more complete discussion of emulsifiers as they relate to surface area of the polymeric particles, see D. C. Blackley, High Polymer Latices, vol. 2, pp. 486–491, McClaren & Sons, London, 1966. A latex composition having a concentration of emulsifier in excess of the surface area requirements of the copolymer particles of the latex is not readily coagulated by the addition of base or at least is not coagulated for a relatively long period of time. The exact amount of emulsifier desired varies with the particular emulsifier, the copolymer, the average particle size of the latex, and the solids content of the latex. Generally speaking, the latexes of this invention which have emulsifier concentrations up to about 1.6 weight percent based on the polymer solids are coagulated instantaneously by adjusting the pH of the latexes to a value from about 8.8 to about 10.1. Preferred concentrations of emulsifier range from about 0.6 weight percent to about 1.2 weight percent. Latexes having emulsifier concentrations from about 1.8 to about 3.0 weight percent usually coagulate within 2 or 3 hours. Suitable stabilizing emulsifiers are selected from anionic and nonionic types—some of which are the alkyl aryl sulfonates, the alkali metal alkyl sulfates, the fatty acid soaps, the polyether alcohols and the like. For purposes of illustration and not limitation, specific examples of suitable emulsifiers include sodium dodecyl benzene sulfonate, sodium lauryl sulfate, the dihexyl ester of sodium sulfosuccinic acid, and isooctylphenyl polyethoxy ethanol.

The anionic latex composition of this invention requires (1) a copolymer of from about 70 weight percent to about 98.5 weight percent of the alkyl acrylate ester and from about 1.5 weight percent to about 8 weight percent of the $\alpha,\beta$-ethylenically unsaturated carboxylic monomer and (2) an amount of emulsifier sufficient to maintain colloidal stability of the particular latex composition, usually up to about 1.6 weight percent being based on polymer solids. These novel latex compositions have particles of polymer with average diameters from about 2500 to about 4000 angstrom units. These latexes are also made at or adjusted to a solids content in the range of from about 45 weight percent to about 69 weight percent polymer solids.

The latex compositions of this invention are suitably prepared by an emulsion polymerization process wherein the monomeric components are dispersed in an acidic aqueous medium containing a free-radical producing catalyst in an amount from about 0.01 weight percent to about 3 weight percent being based on total monomer weight. Examples of suitable free-radical producing catalysts include peroxygen compounds especially the inorganic persulfates such as sodium persulfate, ammonium persulfate, and potassium persulfate; the peroxides such as hydrogen peroxide; the organic hydroperoxides such as cumene hydroperoxide and t-butyl hydroperoxide; the organic peroxides such as benzoylperoxide, acetyl peroxide, lauryl peroxide, peracetic acid, and perbenzoic acid—sometimes activated by a water-soluble reducing agent such as a ferrous compound or sodium bisulfite—and other free radical producing catalysts such as 2,2'-azobisisobutytronitrile.

The aqueous monomeric dispersion is polymerized by initiation with the appropriate catalyst at temperatures ranging from about 0° C. to about 100° C. with a preferred range from about 40° C. to about 60° C.

In a preferred process wherein particles having average diameters from 2500 to 4000 angstroms units are readily attained, a seed latex having an average particle diameter from about 1000 to about 2000 angstrom units and a solids concentration from about 2 to about 15 percent polymer solids is prepared by subjecting a small part of the monomer phase to emulsion polymerization conditions. The remaining monomer phase is then added to the seed system continuously over a long period. During this gradual addition of monomer, the emulsifier and catalyst may also be added in a continuous fashion. The continuous, gradual addition of emulsifier helps to maintain a steady polymerization rate and the surface tension of the latex in the region ranging from 40 to 50 dynes per centimeter. This range of surface tension is required in order to maintain a colloidal stability sufficient to prevent formation of soap micelles and initiation of newly formed latex particles.

The fluid and stable latex prepared by this method is adjusted to a solids content ranging from about 45 to about 69 weight percent copolymer and the pH is raised to 5.5 to 6.0 prior to coagulation. It is critical that the solids content of the latex composition be adjusted to a value from about 45 to about 69 percent; otherwise the latex will thicken, but will not coagulate, when the pH is adjusted to a value between about 8.8 and about 10.1. However, the latex composition having a solids content below 45 weight percent will coagulate if a latex having a solids content substantially greater than 45 percent is added until the overall solids content of the total latex composition is raised above 45 percent.

Gelation or coagulation of the latex is accomplished by addition of basic solution or by exposure to a basic vapor until the pH of the latex reaches a value in the range from about 8.8 to about 10.1, preferably from 8.8 to 9.1. Coagulation of the latex also occurs if the solids content of the latex having a pH in the range of 8.8 to 10.1 is adjusted to 45 to 69 percent copolymer. Examples of suitable gelling agents include ammonia, ammonium hydroxide, sodium hydroxide, potassium hydroxide, ethylene diamine, and other strong bases, with ammonia and ammonium hydroxide being preferred. Gelation of the latex composition is an irreversible process; thus the gelled latex is not redispersible in water. If the pH of the composition is raised very rapidly to a pH value greater than 10.1 coagulation does not occur for several hours if at all. However, the latex at a pH greater than 10.1, may be gelled by adding sufficient acid to lower the pH to within the desired range or by adding another latex composition having a pH below the desired range until the desired pH is reached.

For the purposes of illustrating and not limiting the invention, the following examples are shown. All parts and percentages in the specification and claims are by weight unless otherwise indicated.

Example 1

An initial charge for seed preparation consisting of 47 lbs. of deionized water, 19 grams of sodium lauryl sulfate (30% active ingredient), 115 grams of potassium persulfate, 100 grams of sodium sulfate, and 30 grams of sodium metabisulfite is mixed with 2.5 lbs. of an 89.10 lb. monomer mix consisting of 86.4 lbs. of n-butyl acrylate, 2.25 lbs. of methacrylic acid, and 0.45 lb. of maleic anhydride in a 20 gallon Pfaudler kettle under nitrogen. The mixture is heated to 42° C. and stirred for 40 minutes. The remaining 86.60 lbs. of the monomer mix plus 0.9 lb. of ethylene dimethacrylate are then pumped into the kettle continuously over a 7 hour period. Thirty minutes after the addition of the monomer mix has begun a solution consisting of 3444 grams of deaerated water, 1435 grams of sodium lauryl sulfate (30% active ingredient), 77.5 grams of sodium bisulfite and 62.0 grams of ammonium hydroxide is pumped into the kettle at a rate of 325 ml. per hour. Conversion to polymer with time is recorded as shown in Table I.

TABLE I

Conversion rate of n-butyl acrylate copolymer latex

| Hours at 42° C.: | Percent solids of latex |
|---|---|
| 6 | 41.0 |
| 8 | 48.6 |
| 10 | 53.6 |
| 12 | 57.3 |

After 12 hours a solution consisting of 327 grams of 2-sulfoethyl methacrylate, 66 grams of sodium lauryl sulfate, and 1607 grams of deaerated water is added over a 15 minute period to the latex composition to act as a stabilizing influence. At 14.5 hours an extra catalyst shot consisting of 2.0 grams of ammonium persulfate and 200 grams of deaerated water is blown in in with nitrogen pressure to assure complete conversion. At 16 hours after a solids contents of 60% and a pH of 2.5 is reached, the reaction is terminated. Concentrated ammonium hydroxide is slowly dripped into the kettle to raise the pH to 5.5-6.0 for storage and use. Analysis of the latex shows less than 0.3 percent by weight of monomer remaining, thus the conversion is virtually complete. The resultant product is a 60% solids content, stable latex having an average particle size of 3000 angstrom units as determined by light scattering, and a surface tension of 41 dynes per centimeter.

Gelation of the latex occurs when sufficient ammonium hydroxide or ammonia gas is introduced to raise the pH of the latex composition to 8.8.

Similar latex compositions not containing 2-sulfoethyl methacrylate and ethylene dimethacrylate are also readily gelled by raising the pH to 8.8.

Examples 2-13

Latex compositions similar to Example 1 having different copolymers are prepared according to the procedure of Example 1. These compositions are adjusted to a pH between 8.8 and 10.1 and the results are shown in Table II. Several sample latex compositions having monomer moieties outside the operable range of this invention are also adjusted to pH from 8.8 to 10.0 and the results are shown in Table III for comparison purposes. These sample latexes are designated as $S(x)$ where $x$ is a whole number and not to be construed as examples of the invention.

TABLE II

| | Percent of— | | | Copolymer, percent of— | | Particle diameter A°[3] | pH[4] | Results |
|---|---|---|---|---|---|---|---|---|
| | Alkyl acrylate | Carboxylic monomer | Other monomer | Emulsifier[1] | Polymer[2] solids | | | |
| Example Number: | | | | | | | | |
| 2 | 98.0 n-BA | 2.0 MAnh | | 1.2 | 59 | 3,000 | 9.4 | Gelled instantaneously. |
| 3 | 98.25 n-BA | 1.75 MAA | | 1.2 | 61 | 3,000 | 9.8 | Gelled slowly. |
| 4 | 97.0 EA | {2.5 MAA, 0.5 MAnh} | | 1.2 | 60 | 3,000 | 8.8 | Gelled instantaneously. |
| 5 | 97.0 MA | {2.5 MAA, 0.5 MAnh} | | 1.2 | 60 | 3,000 | 8.8 | Do. |
| 6 | 97.0 n-BA | {2.6 MAA, 0.4 MAnh} | | 1.2 | 60.4 | 3,060 | 8.8 | Do. |
| 7 | {67.3 n-BA, 29.7 EA} | 3.0 MAA | | 1.2 | 59 | 3,000 | 9.85 | Gelled in 3 minutes. |
| 8 | 97.0 n-BA | {2.0 MAA, 0.4 MAnh} | 0.6 2-SEM | 1.2 | 59 | 3,000 | 9.45 | Gelled instantaneously. |
| 9 | {95.4 n-BA, 1.0 EDA} | {2.5 MAA, 0.5 MAnh} | 0.6 2-SEM | 1.2 | 60 | 3,060 | 9.0 | Do. |
| 10 | 89.0 n-BA | {2.5 MAA, 0.5 MAnh} | 8.0 VCN | 1.28 | 60 | 3,000 | 9.4 | Do. |
| 11 | 89.1 n-BA | {2.5 MAA, 0.5 MAnh} | 7.9 VA | 1.28 | 60 | 3,000 | 9.4 | Do. |
| 12 | {67.0 n-BA, 30.0 2-EAA} | {2.5 MAA, 0.5 MAnh} | | 1.28 | 60 | 3,000 | 9.4 | Do. |
| 13 | 87.0 n-BA | {2.5 MAA, 0.5 MAnh} | 10.0 Sty | 1.28 | 60 | 3,000 | 9.4 | Do. |

[1] Percent dry weight based on polymer solids.
[2] Percent solids before adjustment of pH in percent dry weight based on total latex composition.
[3] Particle average diameter determined by dissymmetry measurements on Brice-Phoenix instrument ($\lambda$=5193 A.).
[4] PH increased by adding concentrated $NH_4OH$.

NOTE.—In the preceding Table II the abbreviations for the monomeric components are defined as follows: n-BA=n-Butyl acrylate; EA=Ethyl acrylate; 2-EHA=2-ethylhexyl acrylate; 2-SEM=2-sulfoethyl methacrylate; VCN=Acrylonitrile; MA=Methyl acrylate; VA=Vinyl acetate; EDA=Ethylene dimethacrylate; MAA=Methacrylic acid; MAnh=Maleic anhydride.

TABLE III

| | Percent of— | | | Copolymer Percent of— | | Particle diameter, A.[3] | pH[4] | Results |
|---|---|---|---|---|---|---|---|---|
| | Alkyl acrylate | Carboxylic monomer | Other Monomer | Emulsifier[1] | Polymer[2] solids | | | |
| Sample Number: | | | | | | | | |
| S(1)* | 97.0 n-BA | 3.0 AA | | 1.2 | 60 | 2,950 | 10.3 | Thickened, not gelled in 3 days. |
| S(2)* | 99.5 n-BA | 0.5 MAA | | 1.2 | 60 | 2,950 | 9.9 | Not gelled in 3 days. |
| S(3)* | 99.0 n-BA | 1.0 MAA | | 1.2 | 60.8 | 3,000 | 9.95 | Gelled overnight. |
| S(4)* | 99.0 n-BA | 1.0 MAnh | | 1.2 | 60 | 3,000 | 10.25 | Gelled in 3 days. |

[1][2][3][4] See footnotes [1][2][3][4] bottom of Table II.
*Not an example of the invention.

NOTE.—In the above Table III the abbreviations for the monomeric components are defined as follows: n-BA=n-butyl acrylate; AA=Acrylic acid; MAA=Methacrylic acid; and MAnh=Maleic anhydride.

Example 14

A latex composition having the same monomer moiety as Example 6 is prepared by the procedure of Example 1 except that 1.8 percent by dry weight being based on total monomer weight of sodium lauryl sulfate is used. Sufficient concentrated ammonium hydroxide is added to raise the pH of the composition to 9.2. Gelation is observed after 45 minutes.

Examples 15-16

A latex composition according to Example 6 except having an initial polymer solids of 57 percent is prepared by the procedure of Example 1. The pH of the composition at different polymer solids is adjusted to several values by addition of concentrated ammonium hydroxide.

The results are shown in the following Table IV. For the purposes of comparison the latex composition is diluted to polymer solids outside the operable limits of the invention and such diluted composition, S(5), is not an example of the invention.

TABLE IV

| Example No.: | Percent polymer solids | pH | Gelation behavior |
|---|---|---|---|
| 15 | 57 | 7.1 | Not gelled after 65 hours. |
|  |  | 7.55 | Do. |
|  |  | 7.9 | Do. |
|  |  | 8.25 | Gelled after 65 hours. |
|  |  | 8.5 | Gelled after 16 hours. |
|  |  | 8.85 | Gelled instantaneously. |
| 16 | 50 | 7.1 | Not gelled after 36 days. |
|  |  | 8.1 | Gelled after 36 days. |
|  |  | 9.3 | Gelled after 45 minutes. |
|  |  | 10.4 | Gelled after 15 minutes. |
| S(5)* | 40 | 8.05 | Not gelled after 35 days. |
|  |  | 9.0 | Do. |
|  |  | 9.75 | Borderline gel observed after 45 days. |

*Not an example of the invention.

Example 17

A latex composition is prepared according to Example 1 except that sodium hydroxide is used as the gelling agent instead of ammonia gas. Instantaneous gelation is observed at pH 9.1, but at pH of 8.8 to 9.0 the latex is a thick paste and coagulation is much slower.

Example 18

A latex composition prepared by the procedure of Example 1 is added to concentrated $NH_4OH$ until solids content of 50 percent and a pH of 10.8 is reached. An additional portion of the initial latex having a pH of 5.5 and a solids content of 60 percent is added to the basic system until the pH is lowered to 10.1 and solids content of 56 percent is reached. After 5 minutes gelation of the latex results.

Examples 19–22

Several latex compositions are prepared according to the procedure of Example 1 except a different carboxylic acid selected from the following list of acids is substituted for the carboxylic monomers used in Example 1:

maleic acid
fumaric acid
itaconic acid
aconitic acid

Immediate gelation of each of the above latexes is observed when sufficient concentrated $NH_4OH$ is added to raise the pH of the latexes to 8.8.

What is claimed is:

1. A method for coagulating an anionic latex of a copolymer having an average particle diameter from about 2500 to 4000 angstrom units, said latex consisting essentially of (1) a copolymer of from about 70 percent to about 98.5 percent of an alkyl acrylate ester having an alkyl moiety from 1 to 12 carbon atoms, from about 1.5 percent to about 8 percent of an $\alpha,\beta$-ethylenically unsaturated carboxylic monomer selected from the group consisting of methacrylic acid, maleic acid, maleic anhydride, fumaric acid, itaconic acid, and aconitic acid and up to about 28 percent of an ethylenically unsaturated monomer which is copolymerizable with at least one of the monomers from the above two groups and which is non-reactive with the carboxyl groups of the carboxylic monomer and (2) a stabilizing emulsifier selected from the group consisting of anionic and non-ionic emulsifiers and mixtures thereof in an amount in the range of from about 0.6 to about 3.0 weight percent based on copolymer solids, said amount being less than that required to cover the surface area of the copolymer, said percentages being by weight; said method which consists essentially of adjusting the pH of the latex to a value in the range of from about 8.8 to about 10.1 and adjusting the solids content to within the range of about 45 to about 69 percent copolymer.

2. The coagulated latex composition according to claim 1 wherein the alkyl acrylate is n-butyl acrylate.

3. The coagulated latex composition according to claim 1 wherein the alkyl acrylate is methyl acrylate.

4. The coagulated latex composition according to claim 1 wherein the alkyl acrylate is a mixture of n-butyl acrylate and ethyl acrylate.

5. The coagulated latex composition according to claim 1 wherein the carboxylic monomer is a mixture of methacrylic acid and maleic anhydride.

6. The coagulated latex composition according to claim 1 wherein the emulsifier is sodium lauryl sulfate.

7. The coagulated latex composition according to claim 1 wherein the copolymer comprises from about 92 percent to about 98.5 percent of a lower alkyl acrylate ester having an alkyl moiety from 1 to 12 carbon atoms and from about 1.5 percent to about 8 percent of an $\alpha,\beta$-ethylenically unsaturated carboxylic monomer selected from the group consisting of methacrylic acid, maleic acid, maleic anhydride, fumaric acid, itaconic acid, and aconitic acid, said percentages being by weight.

8. The coagulated latex composition according to claim 1 wherein the copolymer contains from about 2 percent to about 5 percent of the $\alpha,\beta$-ethylenically unsaturated carboxylic monomer.

9. The coagulated latex composition according to claim 1 wherein the composition has a surface tension greater than 40 dynes per centimeter.

10. The composition according to claim 1 wherein the emulsifier is sodium lauryl sulfate and is present in an amount in the range of from about 0.6 to about 1.2 weight percent based on copolymer solids.

11. A coagulated latex composition consisting essentially of (1) a copolymer of from about 70 to about 98.5 weight percent of an alkyl acrylate ester having an alkyl moiety from 1 to 12 carbon atoms, from about 1.5 to about 8 weight percent of an $\alpha,\beta$-ethylenically unsaturated carboxylic monomer selected from the group consisting of methacrylic acid, maleic acid, maleic anhydride, fumaric acid, itaconic acid and aconitic acid and up to about 28 weight percent of an ethylenically unsaturated monomer which is copolymerizable with at least one of the monomers from the above two groups and which is non-reactive with the carboxyl groups of the carboxylic monomer and (2) a stabilizing emulsifier selected from the group consisting of anionic and non-ionic emulsifiers and mixtures thereof in an amount in the range of from about 0.6 to about 3.0 weight percent based on copolymer solids, said amount being less than that required to cover the surface area of the copolymer, said coagulated latex having a pH in the range of from about 8.8 to about 10.1.

12. A coagulated latex composition according to claim 11 consisting essentially of (1) a copolymer of from about 70 percent to about 98.5 percent of an alkyl acrylate ester having an alkyl moiety from 1 to 12 carbon atoms, from about 1.5 percent to about 8 percent of an $\alpha,\beta$-ethylenically unsaturated carboxylic monomer selected from the group consisting of methacrylic acid, maleic acid, maleic anhydride, fumaric acid, itaconic acid, and aconitic acid and up to about 28 percent of an ethylenically unsaturated monomer selected from the group consisting of ethylene, propylene, butene-1, butadiene, isoprene, styrene, $\alpha$-methylstyrene, ar-methylstyrene, t-butylstyrene, methyl methacrylate, ethyl methacrylate, dimethyl fumarate, diethyl maleate, vinyl acetate, acrylonitrile, vinyl chloride, vinyl bromide, divinyl benzene, ethylene dimethacrylate, vinylidene chloride, $\beta$-hydroxyethyl acrylate, 2-sulfoethyl methacrylate, and acrylamide; and (2) a stabilizing emulsifier selected from the group consisting of the alkyl aryl sulfonates, the alkali metal alkyl sulfates, the fatty acid soaps, the polyether alcohols and mixtures thereof in an amount in the range of from about 0.6 to about 3.0 weight percent based on copolymer solids, said amount being less than that required to cover the surface area of the copolymer, said percentages being by weight.

References Cited

UNITED STATES PATENTS

| | | | |
|---|---|---|---|
| 2,795,564 | 6/1957 | Conn et al. | 260—29.6 TA |
| 3,057,812 | 10/1962 | Straughan et al. | 260—29.6 TA |
| 3,297,621 | 1/1967 | Taft | 260—29.6 RU |
| 3,383,846 | 5/1968 | Smith | 260—29.6 RU |
| 3,458,466 | 7/1969 | Lee | 260—29.6 H |

DONALD J. ARNOLD, Primary Examiner

D. A. JACKSON, Assistant Examiner

U.S. Cl. X.R.

260—29.6 RU, 29.6 TA, 86.1 R, 88.1 PC